(12) United States Patent
Boo et al.

(10) Patent No.: US 10,034,541 B2
(45) Date of Patent: Jul. 31, 2018

(54) PANELS COMPRISING A MECHANICAL LOCKING DEVICE AND AN ASSEMBLED PRODUCT COMPRISING THE PANELS

(71) Applicant: VÄLINGE INNOVATION AB, Viken (SE)

(72) Inventors: Christian Boo, Kagerod (SE); Peter Derelov, Helsingborg (SE)

(73) Assignee: VALINGE INNOVATION AB, Viken (SE)

(*) Notice: Subject to any disclaimer, the term of this patent is extended or adjusted under 35 U.S.C. 154(b) by 0 days.

(21) Appl. No.: 15/584,633

(22) Filed: May 2, 2017

(65) Prior Publication Data

US 2017/0360193 A1 Dec. 21, 2017

Related U.S. Application Data

(63) Continuation of application No. 14/972,949, filed on Dec. 17, 2015, now Pat. No. 9,655,442.

(30) Foreign Application Priority Data

Dec. 19, 2014 (SE) ...................................... 1451611

(51) Int. Cl.
  *A47B 47/00* (2006.01)
  *F16B 12/26* (2006.01)
  (Continued)

(52) U.S. Cl.
  CPC ...... *A47B 47/0066* (2013.01); *A47B 47/0075* (2013.01); *A47B 47/0091* (2013.01);
  (Continued)

(58) Field of Classification Search
  CPC ............ A47B 47/0066; A47B 47/0075; A47B 47/0091; A47B 55/00; F16B 12/125
  See application file for complete search history.

(56) References Cited

U.S. PATENT DOCUMENTS 291,032 A 1/1864 Cleland
634,581 A 10/1899 Miller
(Continued)

FOREIGN PATENT DOCUMENTS

CH  685 276 A5  5/1995
CH  696 889 A5  1/2008
(Continued)

OTHER PUBLICATIONS

U.S. Appl. No. 14/486,681, Hans Brännström, filed Sep. 15, 2014.
(Continued)

*Primary Examiner* — Paola Agudelo
(74) *Attorney, Agent, or Firm* — Buchanan Ingersoll & Rooney P.C.

(57) ABSTRACT

A set of panels includes a first panel having a first main plane and a second panel having a second main plane. The panels are provided with a mechanical locking device for locking a first edge of the first panel to a second edge of the second panel. The mechanical locking device includes an edge groove at the first edge, wherein an edge tongue of the second edge is insertable into the edge groove. A flexible tongue is arranged in an insertion groove provided in the edge section groove, and cooperates with a tongue groove provided at the edge section of the second panel. The first and the second panels are locked at a junction plane which is extending between the first main plane and the second main plane. The first edge comprises an edge tongue that extends from the junction plane.

14 Claims, 7 Drawing Sheets

(51) Int. Cl.
*F16B 12/12* (2006.01)
*A47B 55/00* (2006.01)
(52) U.S. Cl.
CPC ............ *A47B 55/00* (2013.01); *F16B 12/125* (2013.01); *F16B 12/26* (2013.01); *A47B 2230/0081* (2013.01)

(56) References Cited

U.S. PATENT DOCUMENTS

| | | |
|---|---|---|
| 701,000 A | 5/1902 | Ahrens |
| 861,911 A | 7/1907 | Stewart |
| 881,673 A | 3/1908 | Ellison |
| 1,534,468 A | 4/1925 | Shea, Jr. |
| 1,954,242 A | 4/1934 | Heppenstall |
| 2,360,451 A | 10/1944 | Stone |
| 2,362,904 A | 10/1944 | Kramer |
| 2,496,184 A | 1/1950 | Von Canon |
| 3,195,968 A | 7/1965 | Freeman |
| 3,284,152 A | 11/1966 | Schörghuber |
| 3,347,610 A | 10/1967 | Pilliod |
| 3,410,441 A | 11/1968 | Rhyne |
| 3,722,704 A | 3/1973 | Piretti |
| 3,722,971 A | 3/1973 | Zeischegg |
| 3,784,271 A | 1/1974 | Schreiber |
| 3,885,845 A | 5/1975 | Krieks |
| 4,089,614 A | 5/1978 | Harley |
| 4,099,887 A | 7/1978 | Mackenroth |
| 4,116,510 A | 9/1978 | Franco |
| 4,142,271 A | 3/1979 | Busse |
| 4,279,397 A | 7/1981 | Larsson |
| 4,509,648 A | 4/1985 | Govang |
| 4,597,122 A | 7/1986 | Handler |
| 4,750,794 A | 6/1988 | Vegh |
| 4,752,150 A | 6/1988 | Salice |
| 4,883,331 A | 11/1989 | Mengel |
| 4,886,326 A | 12/1989 | Kuzyk |
| 4,909,581 A | 3/1990 | Haheeb |
| 5,004,116 A * | 4/1991 | Cattarozzi .......... B65D 11/1873 220/23.4 |
| 5,114,265 A | 5/1992 | Grisley |
| 5,209,556 A | 5/1993 | Anderson |
| 5,212,925 A * | 5/1993 | McClinton ............ B28B 11/044 52/284 |
| 5,360,121 A | 11/1994 | Sothman |
| 5,475,960 A | 12/1995 | Lindal |
| 5,499,886 A | 3/1996 | Short et al. |
| 5,527,103 A | 6/1996 | Pittman |
| 5,658,086 A | 8/1997 | Brokaw et al. |
| 5,893,617 A | 4/1999 | Lee |
| 5,950,389 A | 9/1999 | Porter |
| 6,413,007 B1 | 7/2002 | Lambright |
| 6,505,452 B1 | 1/2003 | Hannig |
| 6,675,979 B2 | 1/2004 | Taylor |
| 6,769,219 B2 | 8/2004 | Schwitte et al. |
| 6,827,028 B1 | 12/2004 | Callaway |
| 7,451,535 B2 | 11/2008 | Wells et al. |
| 7,451,578 B2 | 11/2008 | Hannig |
| 7,584,583 B2 | 9/2009 | Bergelin et al. |
| 7,621,092 B2 | 11/2009 | Groeke et al. |
| 7,641,414 B1 | 1/2010 | Joyce |
| 7,721,503 B2 | 5/2010 | Pervan et al. |
| 7,818,939 B2 | 10/2010 | Bearinger |
| 7,998,549 B2 | 8/2011 | Susnjara |
| 8,038,363 B2 | 10/2011 | Hannig |
| 8,042,311 B2 | 10/2011 | Pervan |
| 8,220,217 B2 | 7/2012 | Muehlebach |
| 8,365,499 B2 | 2/2013 | Nilsson et al. |
| 8,387,327 B2 | 3/2013 | Pervan |
| 8,495,849 B2 | 7/2013 | Pervan |
| 8,505,257 B2 | 8/2013 | Boo et al. |
| 8,544,230 B2 | 10/2013 | Pervan |
| 8,615,952 B2 | 12/2013 | Engström |
| 8,745,952 B2 | 6/2014 | Perra |
| 8,764,137 B2 | 7/2014 | Fehre |
| 8,833,028 B2 | 9/2014 | Whispell et al. |
| 8,887,468 B2 | 11/2014 | Håkansson et al. |
| 9,175,703 B2 | 11/2015 | Maertens |
| 9,290,948 B2 | 3/2016 | Cappelle et al. |
| 9,375,085 B2 | 6/2016 | Derelöv |
| 9,538,842 B2 | 1/2017 | Håkansson et al. |
| 9,655,442 B2 | 5/2017 | Boo et al. |
| 9,714,672 B2 | 7/2017 | Derelöv et al. |
| 9,723,923 B2 | 8/2017 | Derelöv |
| 9,726,210 B2 | 8/2017 | Derelöv et al. |
| 9,745,756 B2 | 8/2017 | Hannig |
| 9,758,973 B2 | 9/2017 | Segaert |
| 9,809,983 B2 | 11/2017 | Trudel |
| 2002/0170258 A1 | 11/2002 | Schwitte et al. |
| 2006/0101769 A1 | 5/2006 | Pervan et al. |
| 2006/0236642 A1 | 10/2006 | Pervan |
| 2006/0273085 A1 | 12/2006 | Casto |
| 2007/0006543 A1 | 1/2007 | Engström |
| 2008/0066415 A1 | 3/2008 | Pervan |
| 2008/0216435 A1 | 9/2008 | Nolan |
| 2008/0236088 A1 | 10/2008 | Hannig et al. |
| 2009/0064624 A1 | 3/2009 | Sokol |
| 2010/0083603 A1 | 4/2010 | Goodwin |
| 2010/0173122 A1 | 7/2010 | Susnjara |
| 2010/0289389 A1 | 11/2010 | Crabtree, II |
| 2011/0225921 A1 | 9/2011 | Schulte |
| 2011/0225922 A1 | 9/2011 | Pervan et al. |
| 2011/0280655 A1 | 11/2011 | Maertens |
| 2011/0283650 A1 | 11/2011 | Pervan et al. |
| 2012/0009383 A1 | 1/2012 | Hardesty |
| 2012/0027967 A1 | 2/2012 | Maertens |
| 2012/0073235 A1 | 3/2012 | Hannig |
| 2012/0124932 A1 | 5/2012 | Schulte et al. |
| 2012/0145845 A1 | 6/2012 | Hightower |
| 2012/0180416 A1 | 7/2012 | Perra et al. |
| 2012/0279161 A1 | 11/2012 | Håkansson et al. |
| 2012/0286637 A1 | 11/2012 | Fehre |
| 2013/0014463 A1 | 1/2013 | Pervan |
| 2013/0048632 A1 | 2/2013 | Chen |
| 2013/0071172 A1 | 3/2013 | Maertens et al. |
| 2013/0081349 A1 | 4/2013 | Pervan |
| 2013/0097846 A1 | 4/2013 | Pettigrew |
| 2013/0111845 A1 | 5/2013 | Pervan |
| 2013/0170904 A1 | 7/2013 | Cappelle et al. |
| 2013/0232905 A2 | 9/2013 | Pervan |
| 2014/0055018 A1 | 2/2014 | Shein et al. |
| 2014/0286701 A1 | 9/2014 | Sauer |
| 2015/0035422 A1 | 2/2015 | Håkansson et al. |
| 2015/0078807 A1 | 3/2015 | Brännström et al. |
| 2015/0078819 A1 | 3/2015 | Derelöv et al. |
| 2015/0196118 A1 | 7/2015 | Derelöv |
| 2015/0198191 A1 | 7/2015 | Boo |
| 2015/0230600 A1 | 8/2015 | Schulte |
| 2015/0368896 A1 | 12/2015 | Schulte |
| 2016/0000220 A1 | 1/2016 | Devos |
| 2016/0007751 A1 | 1/2016 | Derelöv |
| 2016/0145029 A1 | 5/2016 | Ranade et al. |
| 2016/0174704 A1 | 6/2016 | Boo et al. |
| 2016/0192775 A1 | 7/2016 | Andersson |
| 2016/0270531 A1 | 9/2016 | Derelöv |
| 2017/0079433 A1 | 3/2017 | Derelöv et al. |
| 2017/0089379 A1 | 3/2017 | Pervan |
| 2017/0097033 A1 | 4/2017 | Håkansson et al. |
| 2017/0159291 A1 | 6/2017 | Derelöv |
| 2017/0208938 A1 | 7/2017 | Derelöv et al. |
| 2017/0227031 A1 | 8/2017 | Boo |
| 2017/0227032 A1 | 8/2017 | Fridlund |
| 2017/0227035 A1 | 8/2017 | Fridlund |
| 2017/0234346 A1 | 8/2017 | Fridlund |
| 2017/0298973 A1 | 10/2017 | Derelöv |

FOREIGN PATENT DOCUMENTS

| | | |
|---|---|---|
| CH | 698 988 B1 | 12/2009 |
| CN | 203424576 U | 2/2014 |
| DE | 26 35 237 A | 2/1978 |
| DE | 20 2008 011 589 U1 | 11/2008 |
| DE | 20 2009 008 825 U1 | 10/2009 |
| DE | 10 2009 041 142 A1 | 3/2011 |

(56) References Cited

FOREIGN PATENT DOCUMENTS

| | | |
|---|---|---|
| DE | 10 2014 110 124 A1 | 1/2016 |
| EP | 0 362 968 A | 4/1990 |
| EP | 0 675 332 A2 | 10/1995 |
| EP | 0 871 156 A2 | 10/1998 |
| EP | 1 048 423 A2 | 11/2000 |
| EP | 1 048 423 B9 | 5/2005 |
| EP | 1 650 375 A1 | 4/2006 |
| EP | 1 671 562 A1 | 6/2006 |
| EP | 1 863 984 A1 | 12/2007 |
| EP | 1 922 954 A1 | 5/2008 |
| EP | 2 017 403 A2 | 1/2009 |
| EP | 2 037 128 A1 | 3/2009 |
| EP | 1 922 954 B1 | 7/2009 |
| EP | 2 333 353 A2 | 6/2011 |
| EP | 1 863 984 B1 | 11/2011 |
| EP | 3 031 998 A1 | 6/2016 |
| FR | 2 062 731 A5 | 6/1971 |
| FR | 2 517 187 A1 | 6/1983 |
| GB | 1 022 377 A | 3/1966 |
| GB | 2 482 213 A | 1/2012 |
| JP | 2003-239921 A | 8/2003 |
| KR | 10-1147274 B1 | 5/2012 |
| KR | 2014-0042314 A | 4/2014 |
| WO | WO 87/07339 A1 | 12/1987 |
| WO | WO 00/66856 A1 | 11/2000 |
| WO | WO 01/02669 A1 | 1/2001 |
| WO | WO 01/02670 A1 | 1/2001 |
| WO | WO 01/51733 A1 | 7/2001 |
| WO | WO 01/53628 A1 | 7/2001 |
| WO | WO 02/055809 A1 | 7/2002 |
| WO | WO 02/055810 A1 | 7/2002 |
| WO | WO 03/016654 A1 | 2/2003 |
| WO | WO 03/083234 A1 | 10/2003 |
| WO | WO 2004/079130 A1 | 9/2004 |
| WO | WO 2005/068747 A1 | 7/2005 |
| WO | WO 2006/043893 A1 | 4/2006 |
| WO | WO 2006/104436 A1 | 10/2006 |
| WO | WO 2007/015669 A2 | 2/2007 |
| WO | WO 2007/015669 A3 | 2/2007 |
| WO | WO 2007/079845 A1 | 7/2007 |
| WO | WO 2008/004960 A2 | 1/2008 |
| WO | WO 2008/004960 A3 | 1/2008 |
| WO | WO 2008/004960 A8 | 1/2008 |
| WO | WO 2008/017281 A1 | 2/2008 |
| WO | WO 2008/017301 A2 | 2/2008 |
| WO | WO 2008/017301 A3 | 2/2008 |
| WO | WO 2008/150234 A1 | 12/2008 |
| WO | WO 2010/023042 A1 | 3/2010 |
| WO | WO 2010/070472 A2 | 6/2010 |
| WO | WO 2010/070472 A3 | 6/2010 |
| WO | WO 2010/070605 A2 | 6/2010 |
| WO | WO 2010/070605 A3 | 6/2010 |
| WO | WO 2012/082171 A2 | 7/2010 |
| WO | WO 2012/087752 A1 | 8/2010 |
| WO | WO 2011/012104 A2 | 2/2011 |
| WO | WO 2011/012104 A3 | 2/2011 |
| WO | WO 2011/085710 A1 | 7/2011 |
| WO | WO 2011/151737 A2 | 12/2011 |
| WO | WO 2011/151737 A3 | 12/2011 |
| WO | WO 2011/151737 A9 | 12/2011 |
| WO | WO 2011/151758 A2 | 12/2011 |
| WO | WO 2011/151758 A3 | 12/2011 |
| WO | WO 2012/095454 A1 | 7/2012 |
| WO | WO 2012/154113 A1 | 11/2012 |
| WO | WO 2013/025163 A1 | 2/2013 |
| WO | WO 2013/080160 A1 | 6/2013 |
| WO | WO 2013/093636 A2 | 6/2013 |
| WO | WO 2013/093636 A3 | 6/2013 |
| WO | WO 2013/118075 A1 | 8/2013 |
| WO | WO 2014/108114 A1 | 7/2014 |
| WO | WO 2015/038059 A1 | 3/2015 |
| WO | WO 2015/105449 A1 | 7/2015 |
| WO | WO 2015/105450 A1 | 7/2015 |
| WO | WO 2015/105451 A1 | 7/2015 |
| WO | WO 2017/135874 A1 | 8/2017 |

OTHER PUBLICATIONS

U.S. Appl. No. 14/573,572, Christian Boo, filed Dec. 17, 2014.
U.S. Appl. No. 15/271,622, Peter Derelöv, filed Sep. 21, 2016.
U.S. Appl. No. 15/308,872, Darko Pervan, filed Nov. 4, 2016.
U.S. Appl. No. 15/379,791, Niclas Håkansson, filed Dec. 15, 2016.
U.S. Appl. No. 15/366,704, Peter Derelöv, filed Dec. 1, 2016.
U.S. Appl. No. 15/415,356, Peter Derelöv, filed Jan. 25, 2017.
U.S. Appl. No. 15/422,798, Magnus Fridlund, filed Feb. 2, 2017.
U.S. Appl. No. 15/428,469, Magnus Fridlund, filed Feb. 9, 2017.
U.S. Appl. No. 15/428,504, Christian Boo, filed Feb. 9, 2017.
U.S. Appl. No. 15/432,190, Magnus Fridlund, filed Feb. 14, 2017.
U.S. Appl. No. 15/642,757, Derelöv.
U.S. Appl. No. 15/646,714, Derelöv et al.
International Search Report/Written Opinion dated Feb. 25, 2016 in PCT/SE2015/051366, ISA/SE, Patent-och registreringsverket, Stockholm, SE, 8 pages.
Derelöv, Peter., U.S. Appl. No. 15/642,757 entitled "Panels Comprising a Mechanical Locking Device and an Assembled Product Comprising the Panels", filed Jul. 6, 2017.
Derelöv, Peter, et al., U.S. Appl. No. 15/646,714 entitled "Assembled Product and a Method of Assembling the Product", filed Jul. 11, 2017.
U.S. Appl. No. 15/562,254, Derelöv.
U.S. Appl. No. 15/567,507, Boo et al.
U.S. Appl. No. 15/794,491, Derelöv.
U.S. Appl. No. 15/848,164, Fransson, et al.
U.S. Appl. No. 15/293,701, Derelöv.
Derelöv, Peter, U.S. Appl. No. 15/562,254 entitled "Panel with a Slider", filed Sep. 27, 2017.
Boo, Christian, et al., U.S. Appl. No. 15/567,507 entitled "Panel With a Fastening Device," filed Oct. 18, 2017.
Derelöv, Peter, U.S. Appl. No. 15/794,491 entitled "Set of Panels with a Mechanical Locking Device", filed Oct. 26, 2017.
Fransson, Jonas, et al., U.S. Appl. No. 15/848,164 entitled "Device for Inserting a Tongue", filed Dec. 20, 2017.
Derelöv, Peter, U.S. Appl. No. 15/923,701 entitled "Panels Comprising a Mechanical Locking Device and an Assembled Product Comprising the Panels", filed Mar. 16, 2018.

* cited by examiner

FIG 2A
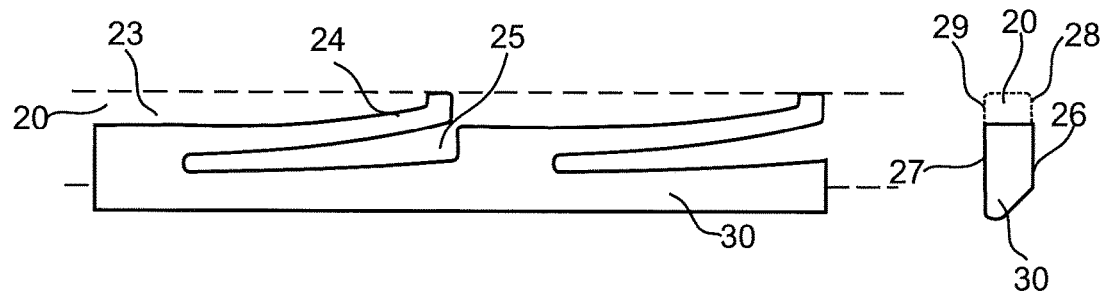
FIG 2B
FIG 2C
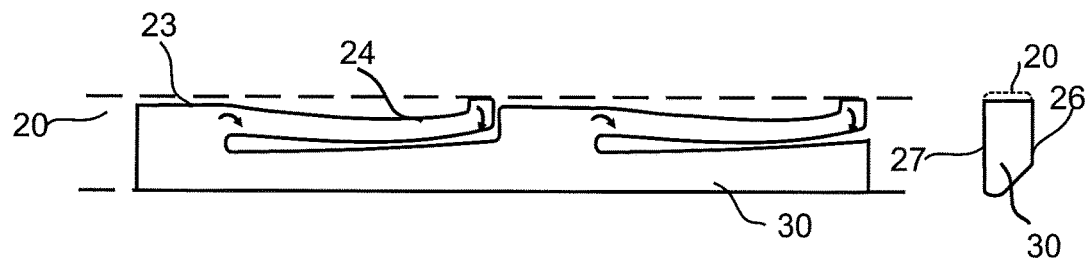
FIG 2D
FIG 2E
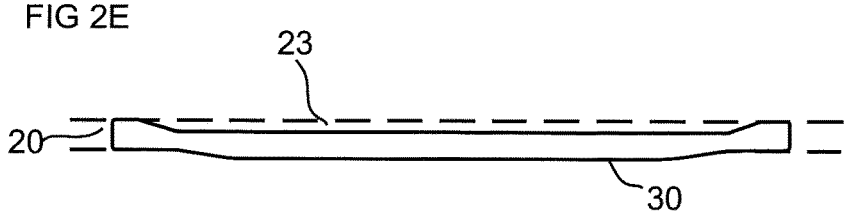
FIG 2F
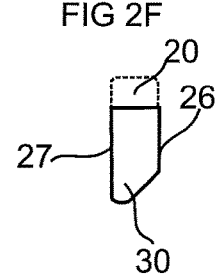

PANELS COMPRISING A MECHANICAL LOCKING DEVICE AND AN ASSEMBLED PRODUCT COMPRISING THE PANELS

CROSS REFERENCE TO RELATED APPLICATIONS

The present application is a continuation of U.S. application Ser. No. 14/972,949, filed on Dec. 17, 2015, which claims the benefit of Swedish Application No. 1451611-6, filed on Dec. 19, 2014. The entire contents of each of U.S. application Ser. No. 14/972,949 and Swedish Application No. 1451611-6 are hereby incorporated herein by reference in their entirety.

TECHNICAL FIELD

The present invention relates to panels that may be arranged perpendicular to each other and locked together with a mechanical locking device. The panels may be assembled and locked together to obtain a furniture, such as a bookshelf, a cupboard, a wardrobe, a kitchen fixture, a box, a drawer or a furniture component. The locking device may comprise a flexible tongue.

BACKGROUND

A furniture provided with a mechanical locking device is known in the art, as evidenced by WO2012154113(A1). The furniture comprises a first panel connected perpendicular to a second panel by a mechanical locking device comprising a flexible tongue in an insertion groove.

SUMMARY

One object of certain embodiments of the present invention to provide an improvement over the above described technique and the known art. A specific objective is to improve the strength of a mechanical locking device at a mitre joint of an assembled product, such as a furniture, a furniture component, a drawer, a cupboard, a bookshelf, a wardrobe, a kitchen fixture, or a box for storing or transporting.

A further object of certain embodiments of the invention is to provide a furniture product with increased strength and stability.

At least some of these and other objects and advantages that will be apparent from the description have been achieved by a set of panels comprising a first panel with a first main plane and a second panel with a second main plane, wherein the first and the second panel are provided with a mechanical locking device for locking a first edge of the first panel to a second edge of the second panel at a junction plane. The first main plane is essentially perpendicular to the second main plane and the junction plane is extending between the first main plane and the second main plane. The first edge comprises an edge tongue, which extends from the junction plane. The second edge comprises an edge groove at the junction plane, wherein the edge tongue is configured to cooperate with the edge groove for locking together the first and the second edges in a first direction which is parallel to the junction plane. The edge tongue comprises a tongue groove and the edge groove comprises a flexible tongue arranged in an insertion groove, said flexible tongue is configured to cooperate with the tongue groove for locking together the first and the second edges in a second direction which is perpendicular to the junction plane.

This configuration provides large locking and contact surfaces and a rigid locking of the panels may be obtained.

The angle between the junction plane and the first main plane is preferably about 45°. A different angle may be preferred for a set with different thicknesses of the first and the second panel. The angle is preferably adapted such that the junction plane extends through an intersection of an outer face of the first panel and an outer face of the second panel to an intersection of an inner face of the first panel and an inner face of the second panel. The inner face of the first panel is facing the inner face of the second panel. An outer face of the first panel is opposite to the inner face of the first panel. An outer face of the second panel is opposite to the inner face of the second panel.

The edge tongue may extend essentially perpendicular from the junction plane.

The edge tongue at the junction plane may comprise a first surface and an opposite second surface, wherein the first and the second surfaces are preferably parallel.

The first surface and the opposite second surface are preferably essentially perpendicular to the junction plane.

The edge groove at the junction plane may comprise a third surface and an opposite fourth surface, wherein the third and the fourth surfaces are parallel to the first surface and to the second surface. The first surface is preferably configured to cooperate with the third surface and the second surface is preferably configured to cooperate with the fourth surface for a locking in the first direction.

The edge tongue may comprise a fifth surface and an opposite sixth surface at the tip of the tongue, wherein the fifth and the sixth surfaces are parallel.

The fifth surface and the opposite sixth surface are preferably essentially perpendicular the junction plane.

The edge groove may comprise a seventh surface and an opposite eighth surface at a bottom of the edge groove, wherein the seventh and the eight surfaces are parallel to the fifth surface and the sixth surface. The fifth surface is preferably configured to cooperate with the seventh surface and the sixth surface is preferably configured to cooperate with the eight surface for a locking in the first direction.

The parallel surfaces may further increase the strength of the locking system and the stability of an assembled furniture product provided with the mechanical locking device. The insertion groove may be arranged parallel to the second main plane or at an acute angle, wherein a bottom of the insertion groove is closer to an inner face of the second panel than an opening of the insertion groove to the edge groove.

The acute angle may be in the range of about 1° to about 30° and preferably about 10°. These angles may provide strong locking between a locking surface of the flexible tongue and a locking surface of the tongue groove The insertion groove may extend along essentially the entire length of the edge groove. The edge groove may extend along essentially the entire length of the second edge.

The flexible tongue is preferably displaceable in the insertion groove.

A core material of the first and the second panel may comprise a wood fibre based board, such as a HDF, MDF, plywood, solid wood or particleboard, or a reinforced plastic board or a wood fibre composite board.

The core is preferably provided with a decorative layer.

An outer bevel edge of the edge tongue may be covered by a part of the decorative layer. The edge tongue may be configured such that when the tongue is formed out of the first panel, by e.g. mechanically cutting such as milling, the bevel with the decorative layer is maintained from a decorative layer that covers a face of the core.

The bevel edge with the decorative layer may be an advantageous surface for the flexible tongue to be displaced along during the assembling of the first panel and the second panel. The first edge may comprises a first edge surface which is parallel to the junction plane, and the second edge may comprises a second edge surface which is parallel to the junction plane, wherein the first edge surface is configured to cooperate with the second edge surface.

The first edge surface or the second edge surface may comprise a recess. The recess may extend over the edge groove. A recess may alternatively be provided at each side of the edge tongue. The recess may improve the contact between the first edge surface and the second edge surface, with increased pressure over a smaller area, and irregularities, such as loose fibres that remains from a mechanical cutting of the mechanical locking system, in the first edge surface or the second edge surface is compressed. A depth of the recess may be in the range of about 0.1 mm to about 0.5 mm, preferably about 0.2 mm.

An outer corner at the junction plane of the first and the second panel may comprise a bevel edge, preferably covered by a decorative layer. The bevel may increase the strength of the corner. The decorative layer may be a plastic foil, veneer or paint. The paint may be applied in a production line for mechanical cutting, such as milling, of the mechanical locking system.

The flexible tongue may alternatively be arranged in an insertion groove in the edge tongue of the second edge of the second panel, and the tongue groove may be arranged in edge groove of the first edge of the first panel. However, a greater size of the insertion groove, as compared to the tongue groove, may be required. Therefore, the alternative with the insertion groove in the edge section groove of the first panel may be the preferred alternative.

The flexible tongue may have a first displacement surface and an opposite second displacement surface which are configured to be displaced along a third displacement surface and a fourth displacement surface, respectively, of the insertion groove.

A second aspect of the invention is an assembled product, such as a furniture or a furniture component, comprising the set of panels as claimed described above.

BRIEF DESCRIPTION OF THE DRAWINGS

Embodiments of the present invention will by way of example be described in more detail with reference to the appended schematic drawings, in which:

FIGS. 2A-2F show a flexible tongue according to an embodiment of the present invention.

DETAILED DESCRIPTION

Figure 1:
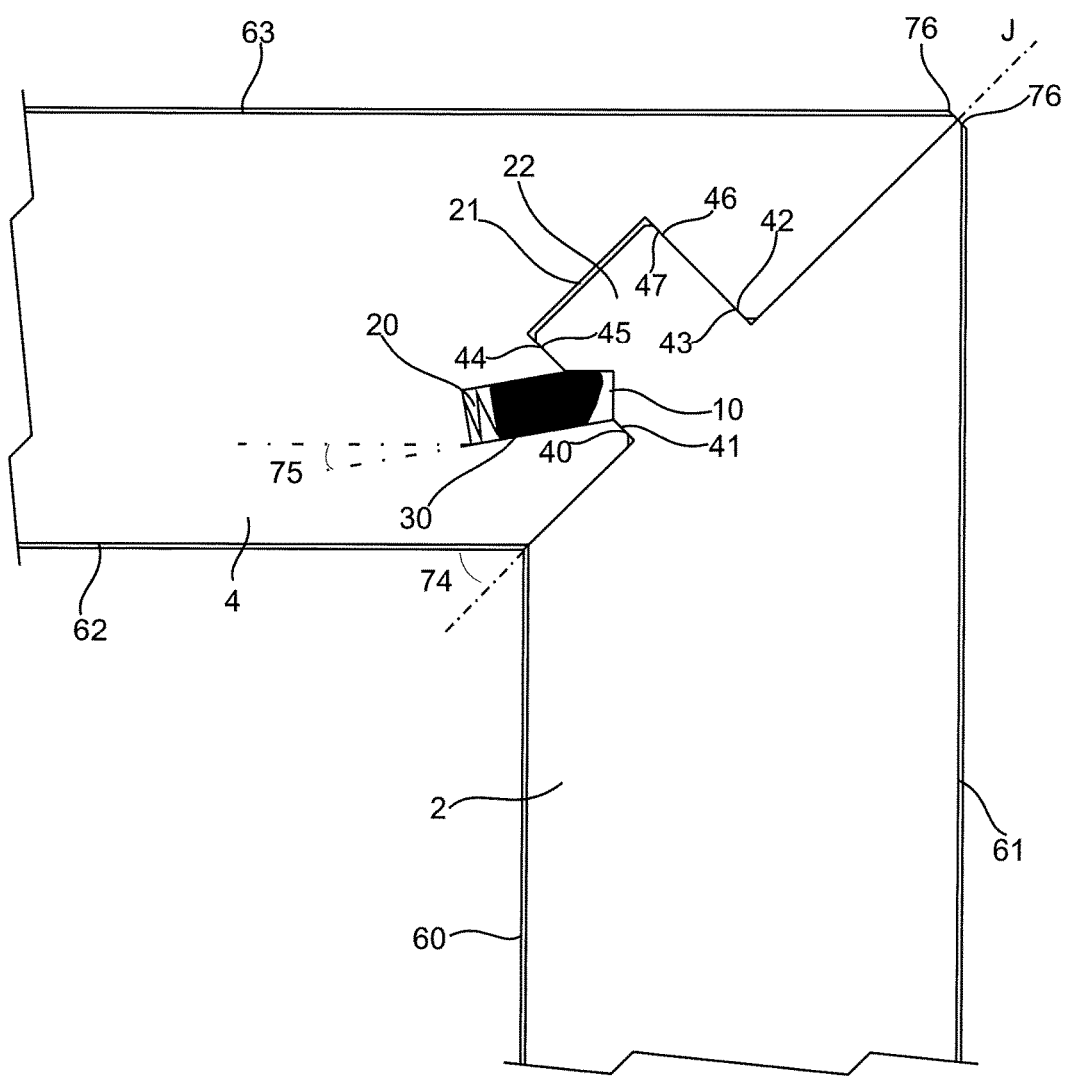
FIG. 1 shows panels provided with a mechanical locking system according to an embodiment of the invention.

FIG. 1 shows two panels 2, 4 that are arranged perpendicular to each other and locked together. The two panels may be a part of a furniture or a furniture component, such as a bookshelf, a cupboard, a wardrobe, a box, a drawer or a furniture component. The two panels may be a first panel 2 having a first main plane and a second panel 4 having a second main plane. The first panel 2 and the second panel 4 are provided with a mechanical locking device for locking a first edge of the first panel 2 to a second edge of the second panel 4, wherein the first main plane is essentially perpendicular to the second main plane. The first edge of the first panel 2 is locked to a second edge of the second panel 4 at a junction plane J extending between the first main plane and the second main plane. The angle between the junction plane and the first main plane is preferably about 45°. The first edge comprises an edge tongue 22 that extends from the junction plane J. The edge tongue 22 extends in this embodiment essentially perpendicular from the junction plane. The second edge comprises an edge groove 21 at the junction plane J, wherein the edge tongue is configured to cooperate with the edge groove for locking together the first and the second edges in a first direction which is parallel to the junction plane J. The edge tongue 22 comprises a tongue groove 10, and the edge groove 21 comprises a flexible tongue 30 arranged in an insertion groove 20. The flexible tongue 30 is configured to cooperate with the tongue groove 10 for locking together the first and the second edges in a second direction, which is perpendicular to the junction plane.

The edge tongue 22 at the junction plane 22 may comprises a first surface 41 and an opposite second surface 43, wherein the first and the second surfaces are parallel and preferably essentially perpendicular to the junction plane J. The edge groove 21 at the junction plane may comprises a third surface 40 and an opposite fourth surface 42, wherein the third and the fourth surfaces are parallel to the first surface 41 and to the second surface 43, wherein the first surface may be configured to cooperate with the third surface and the second surface may be configured to cooperate with the fourth surface for a locking in the first direction.

The edge tongue 22 may comprises a fifth surface 45 and an opposite sixth surface 47 at the tip of the tongue, wherein the fifth and the sixth surfaces 45, 47 are parallel and preferably essentially perpendicular to the junction plane J. The tip may be in an area between the tongue groove 10 and an outer most edge of the edge tongue 22. The edge groove 21 may comprise a seventh surface 44 and an opposite eighth surface 46 at a bottom of the edge groove, wherein the seventh and the eight surfaces 44, 46 are parallel to the fifth surface 45 and the sixth surface 47. The fifth surface 45 may be configured to cooperate with the seventh surface 44 and the sixth surface 47 may be configured to cooperate with the eight surface 46 for a locking in the first direction.

The insertion groove 20 may be arranged at an acute angle 75 to the second main plane, wherein a bottom of the insertion groove is closer to an inner face of the second panel 4 than an opening of the insertion groove 20 to the edge groove 21. The acute angle may be in the range of about 1° to about 30°, for example, about 5° to about 15°, and preferably about 10°. The insertion groove 20 may, as an alternative, be arranged parallel to the second main plane. The insertion groove 20 may extend along essentially the entire length of the edge groove 21 and the edge groove 21 may extends along essentially the entire length of the second edge.

A core of the first and second panel may be wood based. The edge groove 21, the insertion groove 20, the edge tongue 22 and the tongue groove 10 are preferably formed by mechanically cutting, such as milling, of the first panel 2 and the second panel 4, respectively.

The first panel 2 comprises an inner face 60 and an outer face 61 that are preferably essentially parallel to the first main plane. The second panel 4 comprises inner face 62 and an outer face 63 that are preferably essentially parallel to the second main plane. The inner face 60 of the first panel 2 and the inner face 62 of the second panel are preferably configured to face toward an inside of an assembled product. A core of the first and second panel may be wood based and the core is preferably covered with a decorative layer at the inner face and the outer face of the first and the second panel. The edge groove 21, the insertion groove 20, the edge tongue 22 and the tongue groove 10 are preferably formed by mechanically cutting, such as milling, of the first panel 2 and the second panel 4, respectively.

The outer corner of the first panel and the second panel is preferably provided with a bevel 76 in order to increase the strength of the mechanical locking system and cracks at the outer corner may be avoided. The bevel may extend through part of the core, and the bevel is for such an embodiment preferably covered with a decorative layer.

An embodiment of the flexible tongue 30, which is displaceable in an insertion groove 20, is shown in FIGS. 2A-2D. FIGS. 2A-2B show the flexible tongue 30 in a locked potion and FIGS. 2C-2D show the flexible tongue 30 during assembling of the first panel 2 and the second panel 4. FIG. 2B shows a cross section of the flexible tongue 30 in FIG. 2A. FIG. 2D shows a cross section of the flexile tongue 30 in FIG. 2C. The flexible tongue 30 comprises bendable protruding parts 24. A space 23 is provided between the flexible tongue 30 and a bottom wall of the insertion groove 20. FIG. 2C shows that the flexible tongue 30 is pushed into the insertion groove 20 and towards the bottom wall of the insertion groove 20 during assembly of the first panel 2 with the second panel 4. The flexible tongue 30 springs back toward its initial position when the first panel 2 and the second panel 4 have reached a locked position. A recess 25 is preferably arranged at each bendable protruding part.

The flexible tongue 30 may have a first displacement surface 26 and an opposite second displacement surface 27, configured to be displaced along a third displacement surface 28 and a fourth displacement surface 29, respectively, of the insertion groove 20.

An alternative embodiment of the flexible tongue 30, without the protruding bendable parts 24, is shown in FIGS. 2E-2F. FIG. 2F shows a cross section of the flexible tongue 30 shown in FIG. 2E. The alternative embodiment is bendable in its length direction in order to accomplish the same function as the embodiment shown in FIGS. 2A-2D.

Figure 3A:
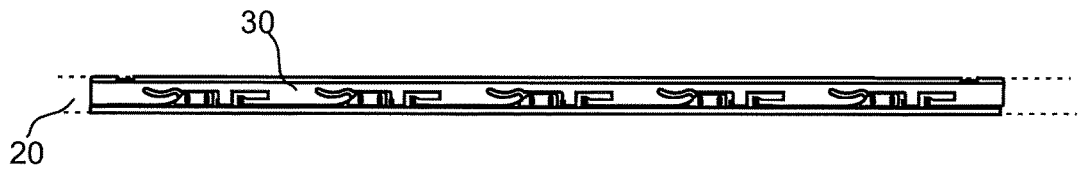
FIGS. 3A-3B show a flexible tongue according to an embodiment of the present invention.
Figure 3B:
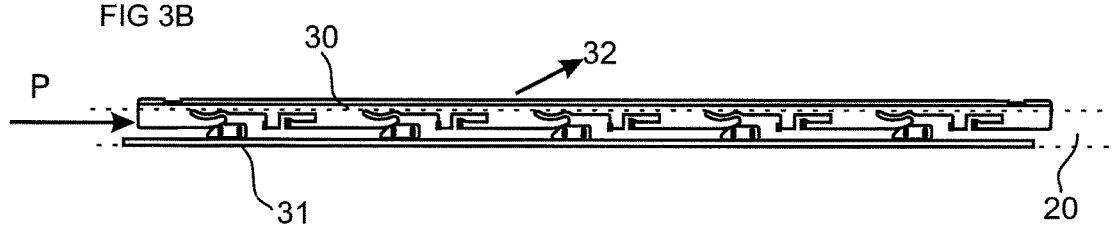

A further embodiment of the flexible tongue 30 is shown in FIGS. 3A-3B. FIG. 3A shows the flexible tongue 30 before the first panel 2 and the second panel 4 are locked in the direction parallel to the second main plane. The flexible tongue 30 comprises an inner part 31 provided with wedge elements and outer part for the locking of the first panel 2 and the second panel 4 in the direction parallel to the second main plane. The locking is obtained by applying a force P, in a direction parallel to the first edge of the first panel 2, at a short edge of the outer part. The force P displaces the outer part of the flexible tongue 30 in the direction parallel to the first edge of the first panel 2 and the wedge elements force the outer part of the flexible tongue 30 in a perpendicular direction, out of the insertion groove 20. The resulting displacement, shown with arrow 32, of the outer part of the flexible tongue 30 is therefore in a direction between the direction parallel to the first edge of the first panel 2 and the perpendicular direction. Each of the panels 2-6 may include a flexible tongue 30.

Figure 3C:
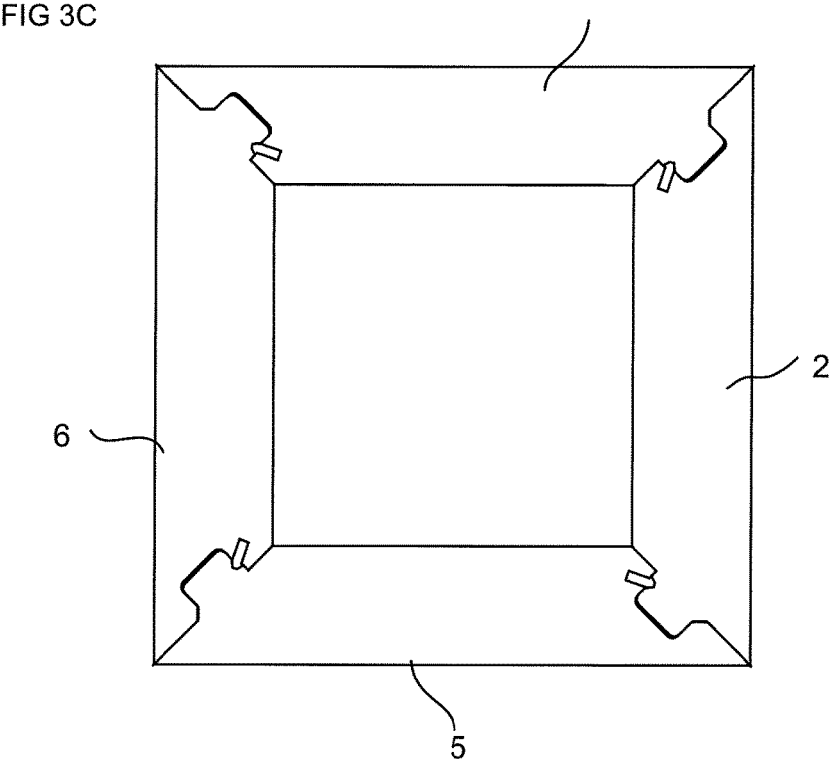
FIG. 3C shows an assembled furniture component according to an embodiment of the present invention.

FIG. 3C shows an embodiment of an assembled product, such as furniture or a furniture component, comprising the set of panels described above. The second edge of the first panel 2 is configured as the second edge of the second panel. The first edge of the second panel 4 is configured the same, or essentially the same, as the first edge of the first panel 2. The first and the second panel 2,4 are thereby configured essentially identical. Two more panels are shown, a third panel 6 and a fourth panel 5, each comprising a first and a second edge that are configured the same, or essentially the same, as the first and the second edge of the first and the second panels 2, 4. The first, second, third and fourth panels are assembled as a frame. Panels that each comprise a first and a second edge that are configured essentially identical may be an advantage since only one type of panels needs to be produced to enable the assembling of wide variety of furniture or furniture components.

Figure 4A:
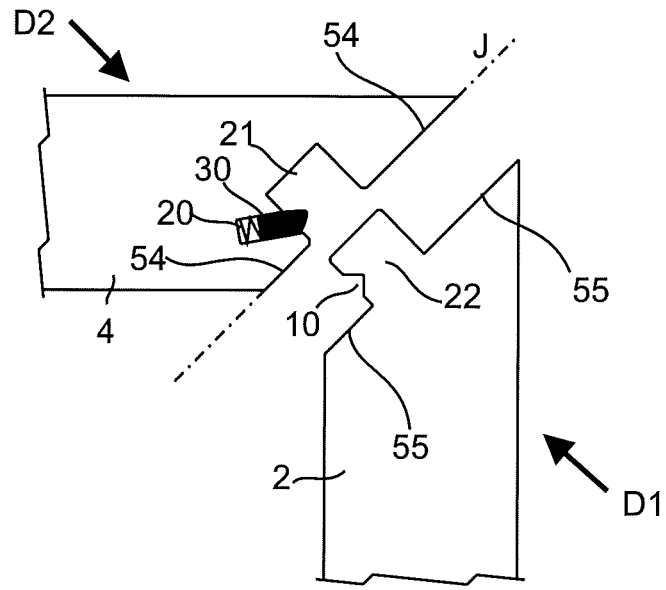
FIGS. 4A-4C show assembling of panels provided with a mechanical locking system according to an embodiment of the present invention.
Figure 4B:
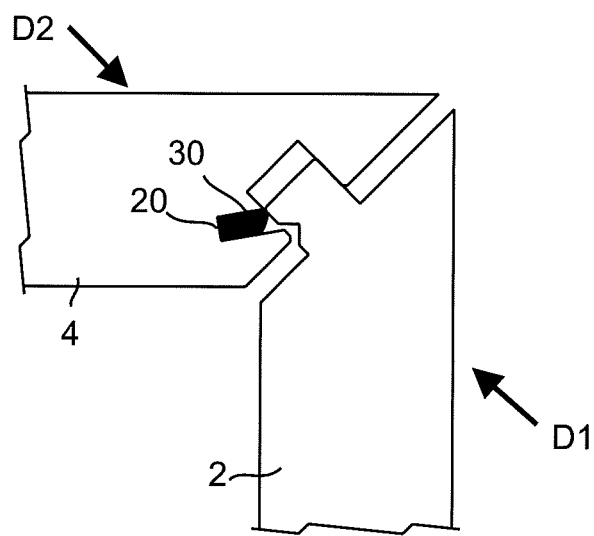
Figure 4C:
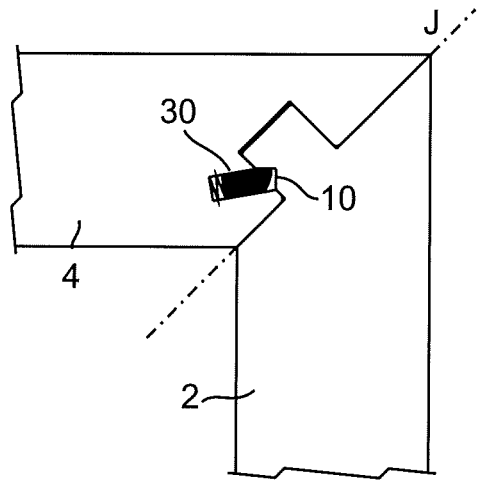

FIG. 4A-4C shows an embodiments of assembling the first 2 and the second panel 4. The first edge comprises a first edge surface 55, which is parallel to the junction plane J, and the second edge comprises a second edge surface 54, which is parallel to the junction plane, wherein the first edge surface 55 is configured to cooperate with the second edge surface 54. The first panel is displaced in a first displacement direction D1, which is perpendicular to the junction plane. The edge tongue 22 is inserted into the edge groove 21 and the flexible tongue is pushed back into the displacement groove and springs back towards the initial position when the first edge surface and the second edge surface are in contact. In an alternative assembling the second panel 4 is displaced in addition or as an alternative to the displacement of the first panel. The second panel is displaced in a second displacement direction D2, which is opposite to the first displacement direction.

Figure 5A:
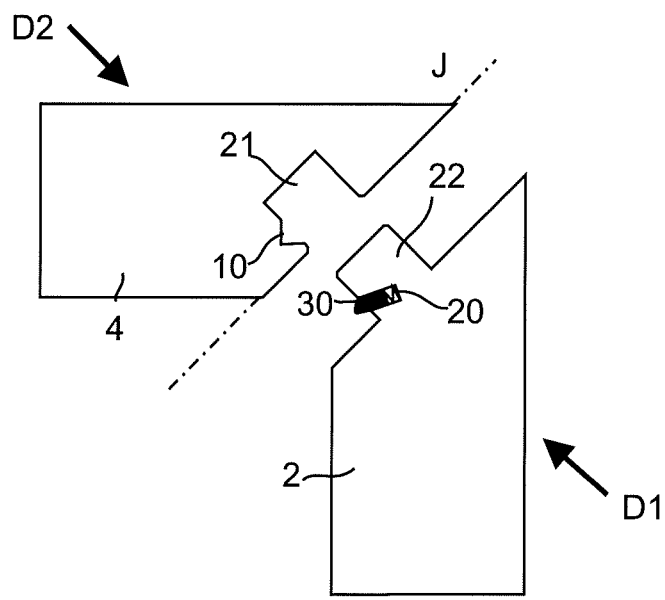
FIGS. 5A-5C show assembling of panels provided with a mechanical locking system according to an embodiment of the present invention.
Figure 5B:
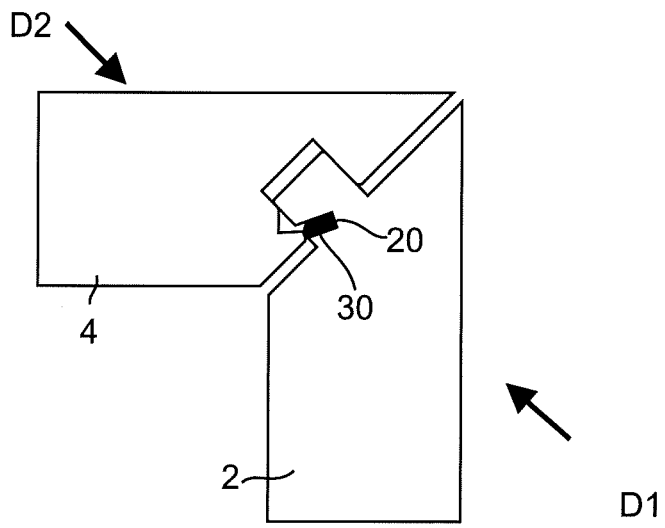
Figure 5C:
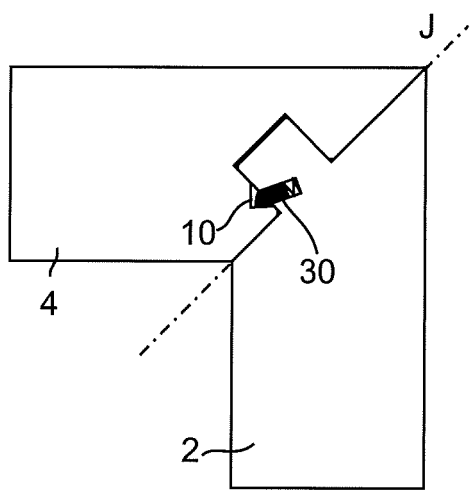
Figure 6A:
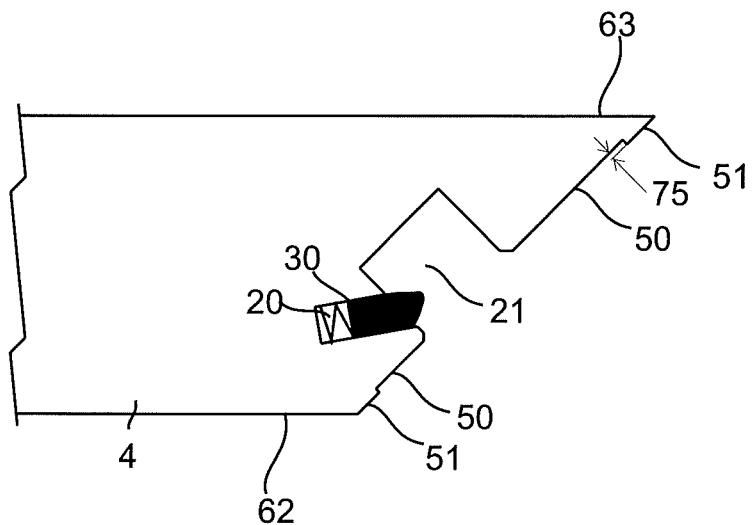
FIGS. 6A-6B show panels provided with a mechanical locking system according to an embodiment of the present invention.
Figure 6B:
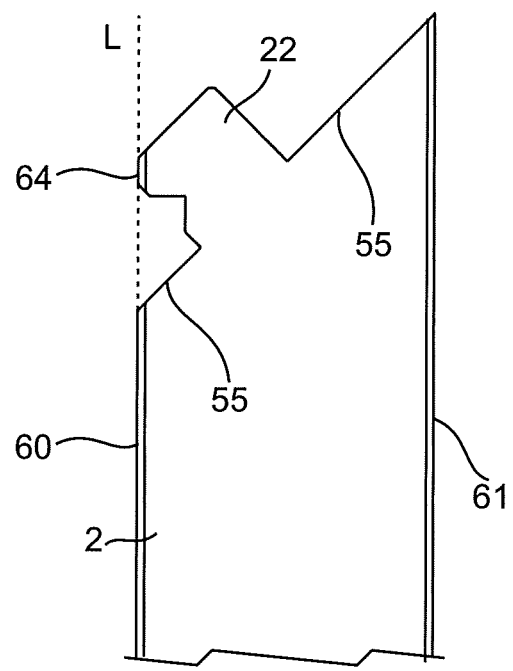

FIG. 5A-5B show that the flexible tongue 30 may alternatively be arranged in an insertion groove 20 in the edge tongue 22 of the second panel 4 and the tongue groove 10 may be arranged in edge groove 21 of the first edge of the first panel 2. However, a greater size of the insertion groove 20, as compared to the tongue groove 10, may be required. Therefore, the embodiment in FIG. 1 with the insertion groove 20 in the edge groove 21 may be a preferred embodiment. The assembling of the first and second panels in FIG. 5A-5C are essentially identical to the assembling of the first and second panels in FIG. 4A-4C. FIG. 6A-6B show an embodiment comprising a recess 50 at the second edge surface. Said recess may extend over the edge groove 21. In an alternative embodiment (not shown in the drawings) the first edge surface 55 is proved with a recess, preferably a recess at each side of the edge tongue 22. The recess may improve the contact between the first edge surface and the second edge surface, with increased pressure over smaller contacts areas 51, and irregularities, such as loose fibres that remains from a mechanical cutting of the mechanical locking system, in the first edge surface or the second edge surface are compressed. A depth 75 of the recess 50 may be in the range of about 0.1 mm to about 0.5 mm, preferably about 0.2 mm. The contact areas 51 are preferably arranged adjacent the inner face and adjacent the outer face. The contact areas 51 may comprise 5-50%, or 10-35%, of the length of the edge surface.

An outer bevel edge of the edge tongue 22 may be covered by a part 64 of the decorative layer arranged on the inner face 60 of the first panel. The edge tongue may be configured such that when the tongue is formed out of the first panel, by e.g. mechanically cutting such as milling, the bevel with the decorative layer is maintained from the decorative layer that covers a face of the core. The part 64 of the decorative layer may therefore be in a same level L as the decorative layer arranged on the inner face 60 of the first panel.

Figure 7A:
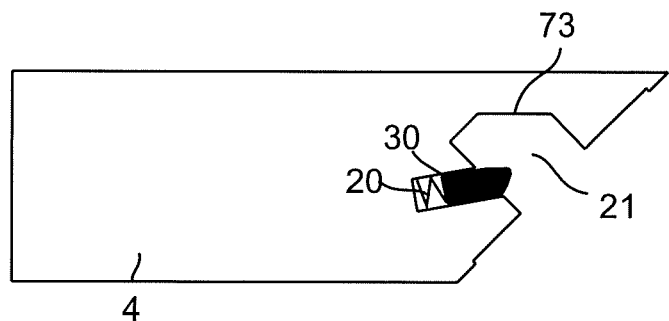
FIGS. 7A-7D show panels provided with a mechanical locking system according to an embodiment of the present invention.
Figure 7B:
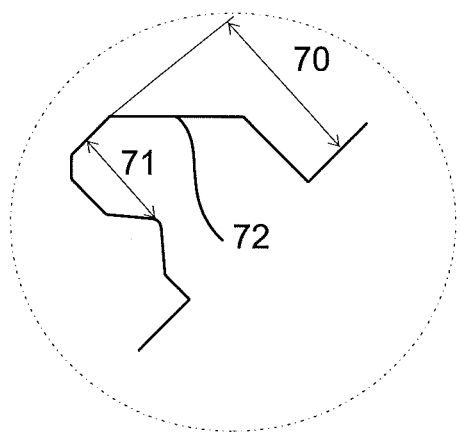
Figure 7C:
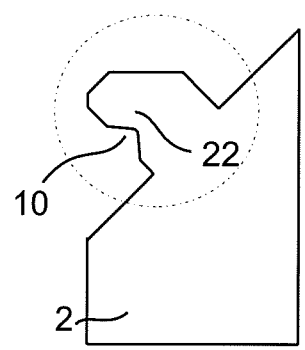
Figure 7D:
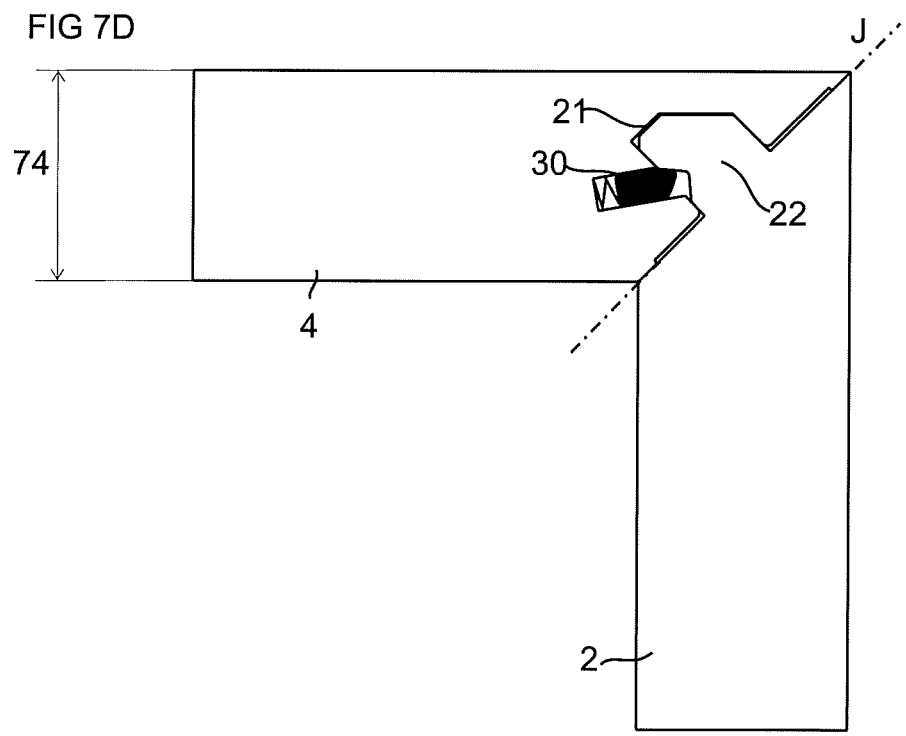

The bevel edge with the decorative layer may be an advantageous surface for the flexible tongue to be displaced along during the assembling of the first panel and the second panel. FIG. 7A-7D show an embodiment that may increase the strength of the edge tongue that may be advantageous for some core materials. A length 70 of the edge tongue is increased to obtain longer distance 71, preferably in the range of about 40% to about 60%, preferably about 50% of the thickness 74 of the second panel 4, and more material between the tongue groove and the tip of the tongue, as is shown in FIG. 7B, which is an enlarged view of the encircled area in FIG. 7C. The edge tongue is adapted to the thickness of the second panel by proving a bevel 72 at the tip of the tongue. The bevel 72 is arranged at the side of the edge tongue that is opposite the side with tongue groove 10. A surface of the bevel is preferably essentially parallel to second main surface and a bottom surface 73 of the edge groove is preferably parallel to the bevel surface.

The core material of the panels and elements in the embodiments above preferably comprises a wood fibre based board, such as a HDF, MDF, plywood, solid wood or particleboard, a reinforced plastic board, or a wood fibre composite board.

The invention claimed is:

1. A set of panels comprising a first panel with a first main plane and a second panel with a second main plane, wherein the first and the second panel are provided with a mechanical locking device for locking a first edge of the first panel to a second edge of the second panel at a junction plane, wherein the first main plane is essentially perpendicular to the second main plane and the junction plane is extending from an inner corner of the first panel and the second panel to an outer corner of the first panel and the second panel between the first main plane and the second main plane, wherein
the first edge comprises an edge tongue that extends from the junction plane,
the second edge comprises an edge groove at the junction plane, wherein the edge tongue is configured to cooperate with the edge groove for locking together the first and the second edges in a first direction which is parallel to the junction plane,
the edge tongue comprises a tongue groove,
a flexible tongue is configured to cooperate with the tongue groove for locking together the first and the second edges in a second direction which is perpendicular to the junction plane, and
the outer corner of the first panel and the second panel is provided with a bevel in order to increase the strength of the mechanical locking system.

2. The set of panels as claimed in claim 1, wherein a core material of the first and the second panel comprises a wood fibre based board, wherein the core is provided with a decorative layer, and wherein the bevel extend through part of the core.

3. The set of panels as claimed in claim 1, wherein the bevel is covered with a decorative layer.

4. The set of panels as claimed in claim 1, wherein the angle between the junction plane and the first main plane is about 45°.

5. The set of panels as claimed in claim 1, wherein edge tongue extends essentially perpendicular from the junction plane.

6. The set of panels as claimed in claims 1, wherein the edge tongue at the junction plane comprises a first surface and an opposite second surface, wherein the first and the second surfaces are parallel, and are perpendicular to the junction plane.

7. The set of panels as claimed in claim 6, wherein the edge groove at the junction plane comprises a third surface and an opposite fourth surface, wherein the third and the fourth surfaces are parallel to the first surface and to the second surface, wherein the first surface is configured to cooperate with the third surface and the second surface is configured to cooperate with the fourth surface for a locking in the first direction.

8. The set of panels as claimed claim 1, wherein edge tongue comprises a fifth surface and an opposite sixth surface at the tip of the tongue, wherein the fifth and the sixth surfaces are parallel, and are perpendicular to the junction plane.

9. The set of panels as claimed in claim 8, wherein the edge groove comprises a seventh surface and an opposite eighth surface at a bottom of the edge groove, wherein the seventh and the eight surfaces are parallel to the fifth surface and the sixth surface, wherein the fifth surface is configured to cooperate with the seventh surface and the sixth surface is configured to cooperate with the eight surface for a locking in the first direction.

10. The set of panels as claimed claim 1, wherein the edge groove extends along essentially the entire length of the second edge.

11. The set of panels as claimed in claim 1, wherein the flexible tongue is displaceable in an insertion groove.

12. The set of panels as claimed claim 1, wherein the first edge comprises a first edge surface which is parallel to the junction plane, and the second edge comprises a second edge surface which is parallel to the junction plane, wherein the first edge surface is configured to cooperate with the second edge surface.

13. The set of panels as claimed in claim 12, wherein the first edge surface or the second edge surface comprises a recess.

14. The set of panels as claimed in claim 1, wherein a core material of the first and the second panel comprises any of HDF, MDF, plywood, solid wood, particleboard, a reinforced plastic board or a wood fibre composite board.

* * * * *

UNITED STATES PATENT AND TRADEMARK OFFICE
CERTIFICATE OF CORRECTION

PATENT NO. : 10,034,541 B2
APPLICATION NO. : 15/584633
DATED : July 31, 2018
INVENTOR(S) : Christian Boo et al.

It is certified that error appears in the above-identified patent and that said Letters Patent is hereby corrected as shown below:

In the Claims

Column 8, Lines 15-16, Claim 5:
"wherein edge tongue"
Should read:
-- wherein the edge tongue --

Column 8, Lines 31-32, Claim 8:
"wherein edge tongue"
Should read:
-- wherein the edge tongue --

Signed and Sealed this
Twenty-third Day of April, 2024

Katherine Kelly Vidal
*Director of the United States Patent and Trademark Office*